Aug. 27, 1963 L. M. PACKHAM 3,101,510
MACHINE FOR FORMING PELLETS AND THE LIKE
Filed June 17, 1960 2 Sheets-Sheet 1

INVENTOR.
LESTER M. PACKHAM
BY
R.E. Geangue
ATTORNEY

Aug. 27, 1963 L. M. PACKHAM 3,101,510
MACHINE FOR FORMING PELLETS AND THE LIKE
Filed June 17, 1960 2 Sheets-Sheet 2

INVENTOR.
LESTER M. PACKHAM.
BY
R. E. Geangue
ATTORNEY

United States Patent Office 3,101,510
Patented Aug. 27, 1963

3,101,510
MACHINE FOR FORMING PELLETS
AND THE LIKE
Lester M. Packham, Sherman Oaks, Calif., assignor to National Frost Protection Co., Inc., a corporation of California
Filed June 17, 1960, Ser. No. 36,795
2 Claims. (Cl. 18—12)

This invention relates to raw material forming machines and more particularly, to a machine for continuously molding or forming raw bulk material into pellets and the like.

It is well recognized in the moldable material forming art that speed and uniformity in the production of products such as pellets or nodules has been particularly desirable in the medicinal, breakfast food, stock food and fertilizer arts, as well as in the formation of mineral and ceramic articles. Such speed and uniformity in certain of these arts is desired largely because the products are handled in bulk and their uses are such as to require enormous quantities thereof each year.

It has been found that one of the best known machines used for the purpose of forming articles of the nature in question is an extruding type machine employing a screw-feed device to force the moldable material through stationary die plates which have numerous openings therein. In operating this type of extruding machine, the shreds, pellets or bodies extruded through the openings are cut or broken into the desired length and thereafter collected in bulk. Nevertheless, many difficulties have been encountered while employing this type of extruding machine and one of the objections is the fact that the capacity of the machine is limited to the size of the die plates capable of being used. Another objection is that an attempt to increase the output of such a machine causes greater compacting of the material which interferes with the proper operation of the cutting mechanism.

Another type of extruding machine consists of a pair of rotary gear dies having cooperating spur teeth for collecting material between said teeth and forcing such material by a cooperating tooth through apertures provided at the root or in the valley between the teeth leading interiorly of the gears. Difficulties have been encountered when employing a device of this nature which stem largely from the fact that the teeth of both gears are arranged in parallel and lie substantially in the same plane as the central axis of die rotation and consequently, the device is generally in a condition variaton between full load or a partial load depending upon the position of the teeth. Consequently, during high speed operation vibrations of a high order are encountered which reduces the quality of the extruded pellet and sometimes causes machine damage. Certainly, a machine of this character cannot be run at high speed. Futrhermore, the teeth exert equal pressure across the area under compression and extrude material out at both ends of the valley causing much inefficiency and waste.

The device of the present invention is intended to overcome the objections and the difficulties hitherto experienced in the art of forming pellets and nodules and the like from compressible raw material, and the invention covers the construction of a machine which will continuously produce uniformly sized articles at high speed.

The present invention further contemplates the providing a pair of rotary gear dies cooperating by means of enmeshed helical teeth to effect the collection of a supply of material and the forcing or extrusion of the material into the hollow interior of the rotary dies; the invention further contemplating the formation of an apparatus having a series of openings in the valleys between adjacent projecting teeth of both rotary dies so that a cooperating projecting tooth on the meshing gears will act as a plunger and effect the extrusion of the material previously deposited and collected within the particular valley, whereby the extruded material will be forced into the interior of the respective hollow gear.

Still a further object of the present invention is to provide an apparatus for forming nodules, pellets and the like whereby continuous high pressure loads are placed during the forming operation on the material wherein such high pressure loads are applied to all areas of the material without differential loading so that the compactness of each extruded pellet remains substantially constant throughout.

Still an additional object of the present invention is to provide an apparatus for forming pellets and the like which employ positive displacement of the material through the extrusion dies regardless of the wetness or dryness of the raw material.

It is an additional object of the present invention to provide an extruding apparatus whereby the side loads are eliminated by the particular arrangement of gear teeth employing the advantage of helical gearing by having continuous tooth contact between the pair of rotary gear dies and thereby eliminating vibration and varying load pressures during tooth engagement. An important feature resides in the fact that material is extruded continuously during machine operation so that the machine is never in a condition of alternation between full load and partial load.

It is a further object of the present invention to increase efficiency by decreasing the amount of material forced out the valleys between the teeth during compression by employing the advantages of the helical tooth configuration in that the outer portion of the tooth engages first and thereby seals the material within the compression area.

The invention additionally contemplates the provision of such an apparatus wherein the mechanism is compact and is completely automatic in operation except for the feeding of raw material thereto.

Other objects and advantages will be apparent from the following detailed description and consideration in connection with the accompanying drawings wherein.

Figure 1:
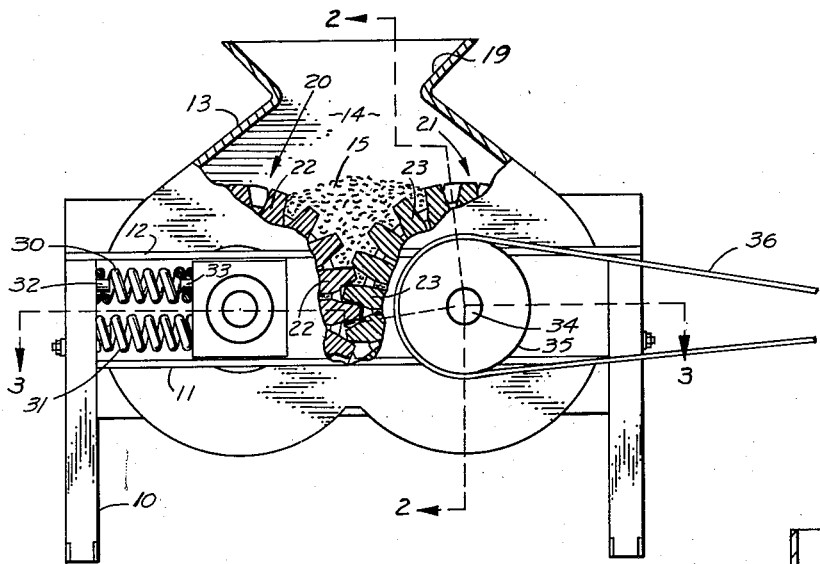
FIGURE 1 is a side view of a pellet-forming apparatus partly shown in section in accordance with the present invention.
Figure 2:
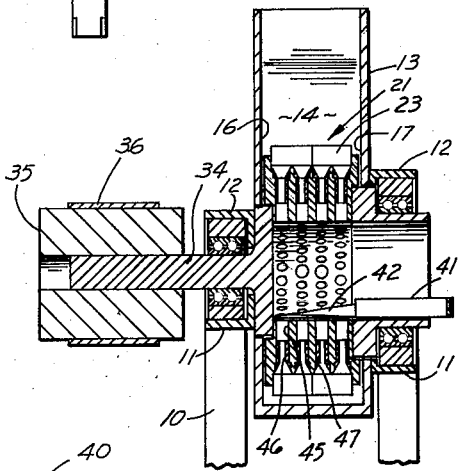
FIGURE 2 is a sectional view taken in the direction of arrows 2—2 of FIGURE 1.
Figure 3:
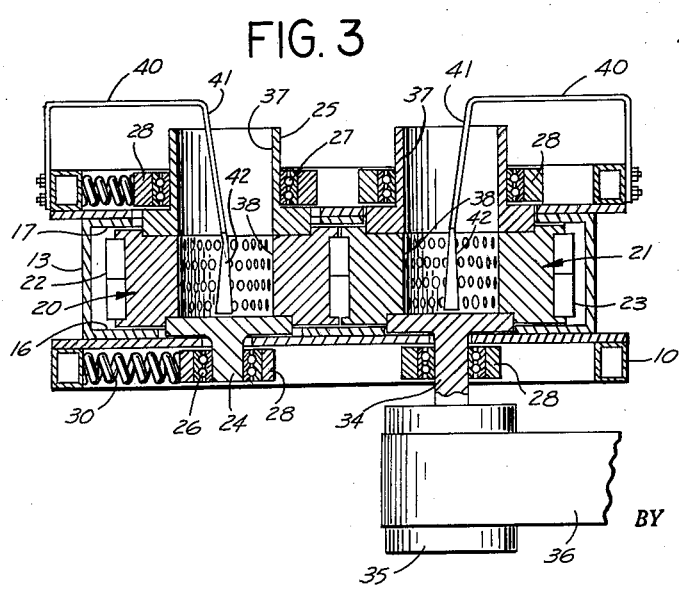
FIGURE 3 is a sectional view of the pellet-forming apparatus of FIGURE 1 taken in the direction of arrows 3—3.

With reference to the forming apparatus shown in FIGURES 1, 2 and 3, such apparatus is shown which includes a plurality of vertical leg members 10 for supporting the machinery of the apparatus wherein the legs associated with opposite sides of the apparatus are connected by horizontal side members 11 and 12 which are arranged in parallel fixed spaced relationship. The construction and formation of side members 11 and 12 are repeated on the opposite side of the apparatus and the two sides of the apparatus are separated by a housing 13 having an interior hopper area 14 opening exteriorly of the housing through a mouth 19 for receiving and storing moldable raw material 15. The housing includes a pair of parallel side panels 16 and 17 which enclose the hopper portion of the housing and further encloses a pair of oppositely disposed die cylinders or gear dies 20 and 21 having a plurality of projections or teeth, such as teeth 22 and 23, spaced apart about the periphery of each cylinder. The pair of cylinders are arranged in an end-to-end relationship so that the teeth as carried on the periphery of each cylinder mesh with the teeth carried on the other cylinder.

It is noted that die cylinders 20 and 21 are rotatably mounted within housing 13 on shaft elements 24 and 25 for example secured to each die cylinder, which are in turn fitted into the inside race of ball bearings 26 and 27 respectively. The outer race of each bearing is journaled into a mounting block, such as block 28, which is suitably contained within the space or area provided between members 11 and 12. The mounting blocks 28 associated with shaft elements 24 and 25 of cylinder 20 are slidably mounted between members 11 and 12 and are spring biased in a direction which insures engagement of the teeth on die cylinder 20 with the teeth of gear 21. The spring biasing is achieved by means of a pair of compressed springs 30 and 31 having opposite ends thereof supported on opposing pin elements 32 and 33 secured to the leg 10 and the mounting blocks 28 respectively.

Shaft element 24 associated with die cylinder 21 is provided with an extension 34 projecting exteriorly of the apparatus for mounting a roller 35 onto which a suitable drive member such as pulley 36 may be seated. The pulley 36 may be readily connected to a suitable power driving source (not shown) by which die cylinder 21 may be rotated and thereby drive the slave die cylinder 20.

Shaft elements 25 fitted in each die cylinder of the pair are substantially similar in construction and are provided with an enlarged bore 37 defining a passageway communicating the hollow interior of each die cylinder defined by annular wall 38 exteriorly of the apparatus.

Means are provided for severing or cutting the extruded material 15 entering the interior of each die cylinder through wall 38 by a cutter comprising a bracket 40 mounted on one end to a leg 10 and bent to a configuration whereby its opposite end presents an arm 41 which projects through bore 37 of the shaft element 25 into the interior of the hollow die cylinder 21, for example. The end of arm 41 is formed with a flange element 42 having a cutting edge adjacent the hollow defining wall 38. Flange 42 remains stationary as the die cylinder is rotated whereby the cutting edge of the flange engages with the extruding material through wall 38 and severs the extrusion to whatever length pellet is desired.

Figure 4:
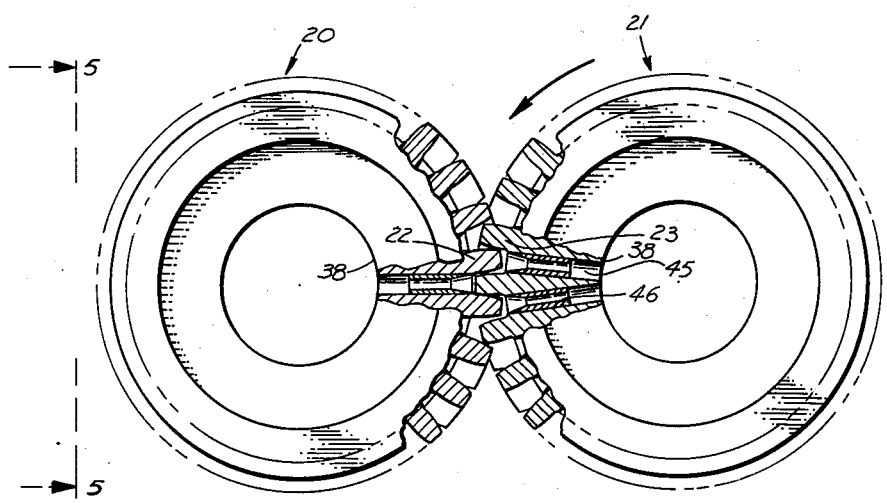
FIGURE 4 is an enlarged view partly in section of the pair of rotary dies having intermeshing helical teeth employed in the apparatus of FIGURE 1.

With reference to FIGURE 4, a pair of die cylinders 20 and 21 are shown having their respective teeth enmeshed, such as teeth 22 and 23. It is noted that the valley or root areas between adjacent teeth associated with a die cylinder are provided with a multiplicity of apertures, such as aperture 45 leading from the valley between adjacent teeth into the hollow interior of each gear defined by wall 38. To insure that the moldable raw material which is forced through the opening is properly compressed and formed, an insert or sleeve 46 is secured within each opening having a bore opening at each end wherein the entrance to the bore of the sleeve from a valley is tapered to further compress the material as it progresses under force through the sleeve into the interior of the cylinder. By this means, the forming of the pellet is achieved not only by the compression of material collected in the valley between the teeth which is forced through the sleeve under pressure from a tooth entering the valley and engaging the material, but the forming is further insured by the shape of the bore of the sleeve which acts as a mold for further compressing the material passing therethrough. The tapered mouth of the bore permits the material to fill up the holes and bores more evenly than if a flat surface were presented.

Figures 5, 6:
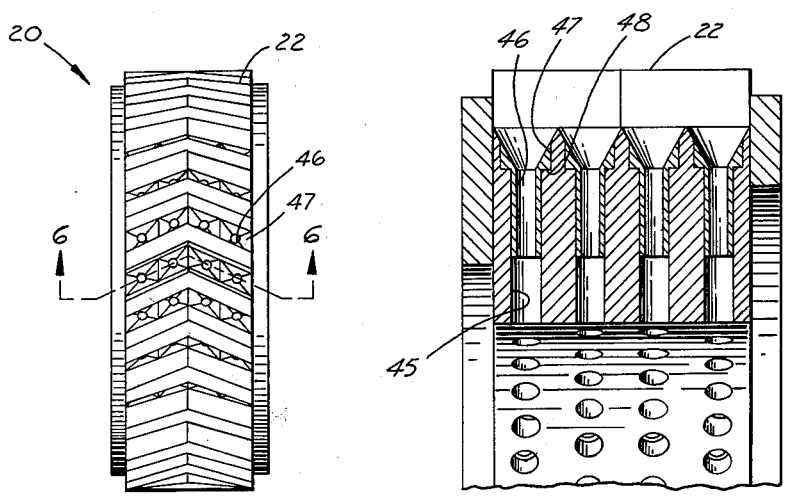
FIGURE 5 is a front view of a rotary die shown in FIGURE 4 taken in the direction of arrows 5—5.
FIGURE 6 is a sectional view of the rotary die gear shown in FIGURE 5 taken in the direction of arrows 6—6.

With reference to FIGURE 5, the projections or teeth 22 carried about the periphery of die cylinder 20 are shown to represent a herringbone configuration. However, it is to be understood that other helical gear formations may be employed and that the herringbone configuration as shown is merely illustrative of one form of helical configuration as opposed to the conventional spur gear or straight tooth configuration. A feature resides in the present invention by providing helical gear configurations for the teeth on the die cylinders so that the rotation between the cylinders runs more smoothly and quietly than if spur gear configurations were employed. Furthermore, since helical teeth introduce an end thrust, the herringbone configuration or a double-helical tooth arrangement is employed to neutralize the development of end thrust. However, if other helical configurations are employed the mounting for the die cylinder can be easily arranged to overcome end thrust considerations, since as the die cylinders rotate, the outer end portions of the teeth and valleys will mesh first to compress material therebetween and form pellets through respective holes. As the die cylinders continue to rotate, the apex or inner portion of the herringbone teeth will compress material through the holes in the apex or inner portion of a mating valley while the material compressed into valley holes at the outer end portions will seal the compression area.

It is noted in FIGURE 5 that not only are the teeth 22 arranged in a herringbone configuration, but the holes 45 provided in the valley between the teeth also follow the herringbone configuration. With reference to FIGURE 6, it is noted that the sleeves 46 may be suitably secured within the hole 45 by providing an enlarged diameter annular flange 47 seated in an annular recess 48 provided in die cylinder about the opening of hole 45 into the valley between projections. It is easily noted in this enlarged view that the mouth of the sleeve is tapered leading away from the teeth and that the bore of the sleeve is of smaller diameter than the opening 45 into which the sleeve is held. This arrangement insures the compacting of material at the opening or mouth of the sleeve insert as the material passes under pressure through the bore thereof and hole 45 into the hollow interior of the die cylinder.

The apparatus of the present invention may be operated by pouring raw material 15 through mouth 19 into the housing 13. The die cylinders are placed in motion by the application of power through the belt 36 so that cylinder 21 drives cylinder 20. The material may be in a dry state or in a more or less semi-moist state so that it can be thoroughly mixed within the housing 13 by suitable means.

The material 15 settles downwardly towards the space between the adjacent teeth on each of the die cylinders 20 and 21. During the rotary movement of the die cylinders, the material settles within and completely fills the areas between the teeth. Upon further rotation of the die cylinder, the material is moved off above the extreme edges of the teeth and the material is carried between the teeth until it is engaged by the cooperating teeth of the die cylinder.

It is especially noted that the teeth or projections on one die cylinder will consecutively bear against the material in the valley between the teeth on the opposite die cylinder and that the teeth will extrude a portion of the material through the respective sleeve 46 and opening 45 so that the extruded material will enter into the interior of the respective cylinder.

As the material is forcibly urged into the mouth of a sleeve 46, it enters the tapered bore of the sleeve insert and is further compressed due to the configuration of the bore as the material progresses. As the extruded material passes through the opening 45 and into the interior of the respective die cylinders, it is suspended from the interior wall 38 and reaches the lowermost position of travel. At this point, it is engaged by the cutter flange 42 within the respective cylinder and is severed from the material still remaining within the particular series of openings. The material remaining within the opening constitutes appropriate plugs to effect the closing of the opening until the plugs are later extruded upon the next revolution. The severed pellets or nodules, when cut or broken away from the cutters, fall to the bottom of the die cylinders. The die cylinders are continued to be operated so that the extruded pellets are continuously formed. The extruded pellets collect within the hollow of the die cylinders and eventually are directed out of the interior of the die cylinder by the arm 41 through bore 37 of each shaft element 25. Bags, boxes or the like may be provided to collect the pellets as they are directed out of the cylinders by arm 41.

It is to be particularly pointed out that an evenly distributed force or pressure exists between the two enmeshed die cylinders because of the herringbone configuration of the teeth. Generally, where spur gears are employed, a condition of full load or partial load is alternately experienced because of the fact that at certain times the forming of materials in one series of holes between adjacent teeth is simultaneous whereas when the herringbone configuration is employed, a progressive forming of the material is achieved for the same series of openings. In other words, for any one series of holes, the material is in a different degree or state of formation with respect to the forming of material in other holes of the series. Therefore, the present invention provides full load at all times and die cylinder vibration or oscillation is reduced to a minimum. Any vibration which may be encountered is taken up by the spring biasing means and the reciprocal sliding of the mounting blocks 28 on member 11 and 12 associated with die cylinder 20.

Thereby, it can be seen that the apparatus of the present invention provides a pellet forming machine which relatively distributes loads and pressures evenly and which employs a sleeve for static formation of the pellet as well as dynamic formation by the forcible urging of teeth against material held between adjacent teeth of an opposite die cylinder through an opening in that die cylinder.

While a particular embodiment of the present invention has been shown and described, it will be obvious to those skilled in the art that changes and modifications may be made without departing from this invention in its broader aspects, and therefore, the aim in the appended claims is to cover all such changes and modifications as fall within the true spirit and scope of this invention.

What is claimed is:
1. In a device of the character described, a pair of cooperating hollow die cylinders mounted for rotation to compress a moldable material between them into pellets, each die cylinder having a series of teeth arranged in herringbone configuration and having a plurality of laterally spaced passageways leading from the valleys between successive teeth to the interior of the hollow die cylinder to effect a plunger action by the teeth of the opposite meshing cylinder, said herringbone configuration of the teeth and of the passageways forcing the material from both sides of a tooth toward the center of the die cylinder as the outer portions of a tooth engage the opposite die cylinder before the mid-portion of that tooth engages and each tooth exerts maximum compression as the next successive tooth is exerting partial compression whereby to seal the moldable material within the compression area, thus providing full load on successive teeth at all times, neutralizing end thrust, eliminating extrusion out of the sides of the teeth, and reducing die cylinder vibration.

2. The device of claim 1 in which there are four passageways leading radially from each valley to the interior of the die cylinder, there is an insert fitting each passageway and having a conical entrance portion leading to a sleeve of shorter length than the passageway and having a bore of less diameter than the passageway so that the moldable extruded material is reduced in diameter as a tooth of one die cylinder approaches an insert in the opposite die cylinder and the material is compressed in the conical entrance portion of the insert and the compressed material expands into the bottom portion of the passageway as it leaves the sleeve and finally expands again as the compressed material enters the hollow portion of the die cylinder, and severing means for dividing the extruded material into pellets.

References Cited in the file of this patent
UNITED STATES PATENTS

| | | |
|---|---|---|
| 1,803,344 | Noxon | May 5, 1931 |
| 2,044,376 | Webster | June 16, 1936 |
| 2,052,449 | Connell | Aug. 25, 1936 |
| 2,174,141 | Sizer | Sept. 26, 1939 |
| 2,186,415 | Haworth | Jan. 9, 1940 |

FOREIGN PATENTS

| | | |
|---|---|---|
| 525,350 | Belgium | Jan. 15, 1954 |
| 562,186 | Canada | Aug. 19, 1958 |
| 204,764 | Austria | Jan. 15, 1959 |

OTHER REFERENCES

German patent application H23454, VIII d/30g, Jan. 26, 1956.